United States Patent
Chan et al.

(10) Patent No.: US 10,723,510 B2
(45) Date of Patent: Jul. 28, 2020

(54) LOCKING ASSEMBLY THAT LOCKS A CARGO NET TO A PALLET

(71) Applicant: Cathay Pacific Airways Limited, Hong Kong (CN)

(72) Inventors: Hanson How Sin Chan, Hong Kong (CN); Sai Ho Simon Leung, Hong Kong (CN)

(73) Assignee: CATHAY PACIFIC AIRWAYS LIMITED, Hong Kong (CN)

( * ) Notice: Subject to any disclaimer, the term of this patent is extended or adjusted under 35 U.S.C. 154(b) by 0 days.

(21) Appl. No.: 16/464,690

(22) PCT Filed: Jun. 25, 2018

(86) PCT No.: PCT/CN2018/092621
§ 371 (c)(1),
(2) Date: May 29, 2019

(87) PCT Pub. No.: WO2019/019847
PCT Pub. Date: Jan. 31, 2019

(65) Prior Publication Data
US 2019/0322414 A1  Oct. 24, 2019

(30) Foreign Application Priority Data
Jul. 25, 2017 (HK) .................................. 17107456.3

(51) Int. Cl.
*B65D 19/38* (2006.01)
*B65D 19/00* (2006.01)

(52) U.S. Cl.
CPC ......... *B65D 19/38* (2013.01); *B65D 19/0002* (2013.01); *B65D 2519/00343* (2013.01); *B65D 2519/00711* (2013.01)

(58) Field of Classification Search
CPC .......................... B60P 7/0807; B60P 7/0815
USPC ................ 108/55.5, 55.3; 410/104, 105, 101
See application file for complete search history.

(56) References Cited

U.S. PATENT DOCUMENTS

| 2,052,914 A | * | 9/1936 | Williams | ................ B60P 3/075 410/9 |
| 2,743,684 A | * | 5/1956 | Elsner | .................... B61D 45/00 410/105 |
| 3,241,501 A | * | 3/1966 | Watts | ..................... B64D 9/003 410/105 |

(Continued)

FOREIGN PATENT DOCUMENTS

| CN | 2416044 | 1/2001 |
| CN | 1740581 | 3/2006 |

(Continued)

*Primary Examiner* — Jose V Chen
(74) *Attorney, Agent, or Firm* — Eagle IP Limited; Jacqueline C. Lui

(57) ABSTRACT

A method and a locking assembly for locking a cargo net to a pallet for preventing access to cargo during transportation is disclosed. One example embodiment provides a locking assembly with an anchor, a retaining ring and a cable tie. The anchor includes a base member, a bolt, and a spring. The retaining ring locks to both the cargo net and the base member. The cable tie locks the bolt and the base member together and prevents the bolt from moving from the base member. Such that the anchor is prevented from being removed from the pallet without destroying the anchor or the pallet.

20 Claims, 6 Drawing Sheets

(56) References Cited

U.S. PATENT DOCUMENTS

| | | | | |
|---|---|---|---|---|
| 3,478,995 | A * | 11/1969 | Lautzenhiser | B61D 45/002 410/104 |
| 4,850,769 | A * | 7/1989 | Matthews | B60P 7/0815 410/105 |
| 5,265,992 | A * | 11/1993 | Jensen | B60P 7/0815 410/104 |
| 5,609,452 | A * | 3/1997 | Looker | B60P 7/0815 244/118.1 |
| 5,625,926 | A * | 5/1997 | Berrezouga | B60P 7/0807 24/265 CD |
| 5,765,978 | A | 6/1998 | Looker et al. | |
| 5,871,318 | A * | 2/1999 | Dixon | B60N 2/01558 244/118.1 |
| 6,631,539 | B1 * | 10/2003 | Chang | B60P 7/0807 24/265 H |
| 6,902,365 | B1 * | 6/2005 | Dowty | B64D 11/0696 244/118.6 |
| 7,175,377 | B2 * | 2/2007 | Womack | B60P 7/0815 410/104 |
| 7,318,695 | B2 * | 1/2008 | Yu | B60P 7/0815 410/105 |
| 7,517,181 | B2 * | 4/2009 | Dunaway | G09F 3/0305 410/104 |
| 7,785,053 | B2 * | 8/2010 | Hudson | B64D 11/0696 410/104 |
| 7,854,204 | B2 * | 12/2010 | Dacus | B29C 70/088 108/51.3 |
| 8,251,623 | B2 * | 8/2012 | Marechal | B64D 11/0696 410/105 |
| 8,356,963 | B2 * | 1/2013 | Frett | B61D 45/002 410/104 |
| 8,360,386 | B2 * | 1/2013 | Marechal | B64D 11/0696 244/118.5 |
| 8,726,472 | B2 * | 5/2014 | Lu | B60P 7/0815 24/265 CD |
| 2005/0132937 | A1 * | 6/2005 | Branam | B65D 19/0002 108/55.5 |
| 2005/0180836 | A1 * | 8/2005 | Dowty | B61D 33/00 410/105 |
| 2006/0051177 | A1 | 3/2006 | Yu et al. | |
| 2006/0104740 | A1 * | 5/2006 | Girardin | B60P 7/0815 410/105 |
| 2010/0288843 | A1 | 11/2010 | Arnesen et al. | |
| 2012/0148364 | A1 | 6/2012 | Frett | |

FOREIGN PATENT DOCUMENTS

| | | |
|---|---|---|
| CN | 102372118 | 9/2015 |
| HK | 1233124 | 1/2018 |

* cited by examiner

Provide a locking assembly comprising an anchor to engage with the pallet, that includes a base member having a neck with a first hole and a second hole, a body with a third hole, and two feet that slide into a channel formed in the pallet; a bolt having a head and two parallel protrusions that extend outwardly from the head, that create a gap that receives the neck, and that have a fourth hole on each of the protrusions; and a spring that is positioned in the first hole of the neck and that biases the bolt between a locked position in which the base member is prevented from sliding in the channel and an unlocked position in which the base slides in the channel
501

Provide a retaining ring that locks to both the cargo net and the third hole in the body of the base member
502

Provide a cable tie that fits through the second hole in the base member and the fourth hole in the bolt and prevents the bolt from moving from the locked position to the unlocked position
503

Fig. 6

LOCKING ASSEMBLY THAT LOCKS A CARGO NET TO A PALLET

FIELD OF INVENTION

This invention relates to a method and system of securing cargo, in particular a method and system for preventing access to cargo during transportation.

BACKGROUND OF INVENTION

Conventional methods and systems of securing cargo for freight forwarding typically uses a network of bands to secure cargo onto a pallet. This may raise security issues during transportation.

SUMMARY OF INVENTION

In the light of the foregoing background, it is an object to provide an alternate system for secure transportation of cargo.

Accordingly, one example embodiment, in one aspect, is a locking assembly that locks a cargo net to a pallet, the locking assembly comprising: an anchor that includes: a base member having a neck with a first hole and a second hole, a body with a third hole, and two feet that slides into a channel formed in the pallet, a bolt having a head and two parallel protrusions that extend outwardly from the head, that create a gap that receives the neck, and that have a fourth hole on each of the protrusion, and a spring that is positioned in the first hole of the neck and that biases the bolt between a locked position in which the base member is prevented from sliding in the channel and an unlocked position in which the base member slides in the channel; a retaining ring that locks to both the cargo net and the third hole in the body of the base member; and a cable tie that fits through the second hole in the base member and the fourth hole in the bolt and prevents the bolt from moving from the locked position to the unlocked position.

BRIEF DESCRIPTION OF FIGURES

FIG. 6 shows a method to lock a cargo net to a pallet in accordance with an example embodiment.

DETAILED DESCRIPTION

Figure 1A:
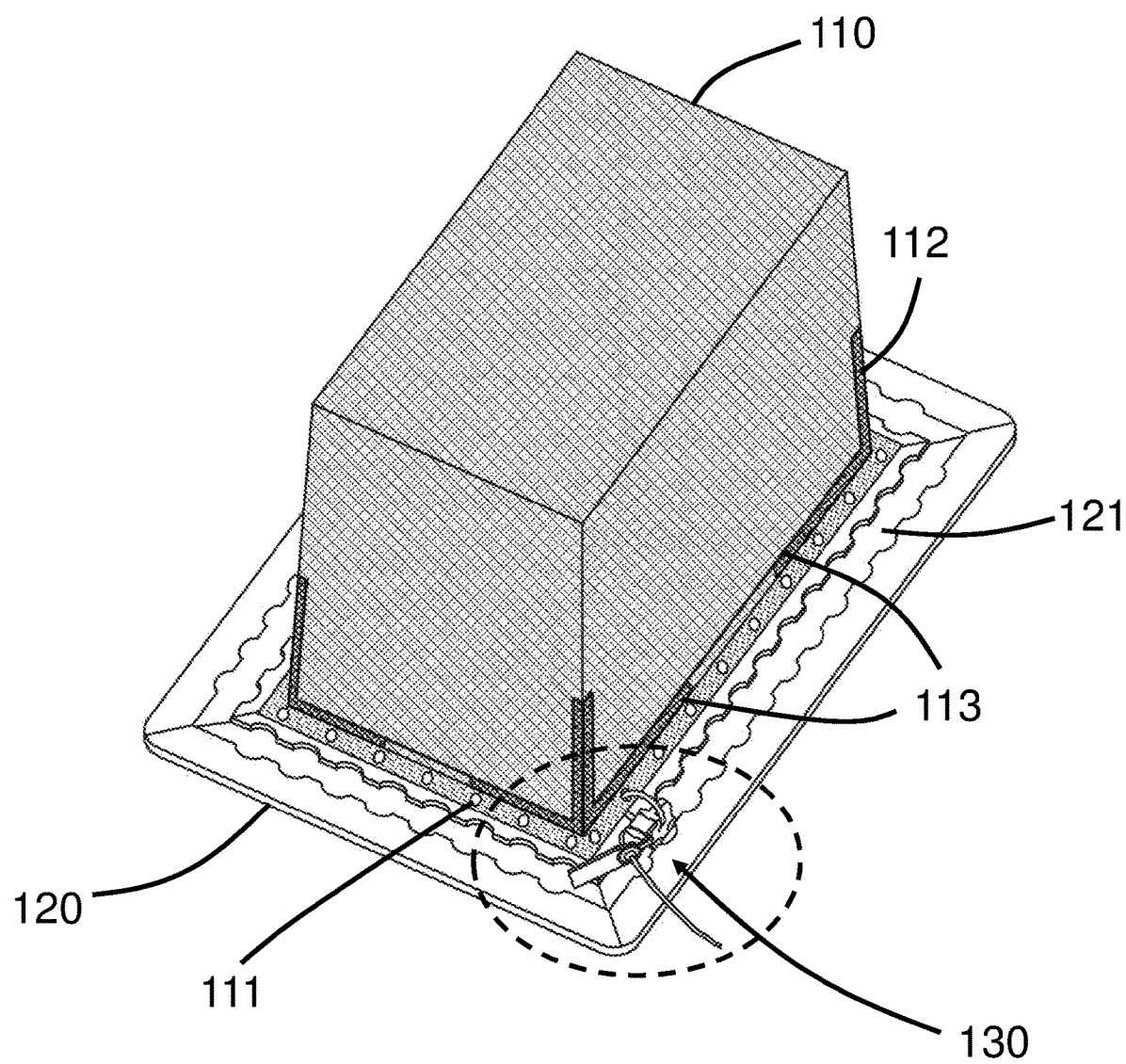
FIG. 1*a* is a perspective view of a locking assembly locking a cargo net to a pallet in accordance with an example embodiment.

Referring now to FIG. 1*a*, an example embodiment relates to a locking assembly 130 that locks a cargo net 110 to a pallet 120. Cargo is located on the pallet 120 and covered with the cargo net 110.

The cargo net 110 is a net to secure cargo to prevent it from shifting during transport, as well as to deter theft. Cargo nets can have various sizes and shapes and include holes of various sizes and shapes. In one example embodiment, the cargo net 110 includes holes that prevent foreign objects from accessing the cargo. In one example embodiment, the cargo net 110 is made from polyester and the hole size is approximately 1 cm×1 cm (though holes with different sizes can also be used). A plurality of openings 111 are positioned at a periphery or edge of the cargo net 110. Each locking assembly 130 is adapted to couple to one of the openings 111 and also adapted to lock to a channel 121 formed in the pallet 120 beneath the cargo.

In an example embodiment, a vertical elastic band 112 extends substantially vertically from a bottom corner to a middle of a vertical edge. This orientation of the vertical elastic bands allows the cargo net 110 to accommodate a range of cargo heights and shapes. Two horizontal elastic bands 113 are running substantially horizontally from the bottom corner to one-third point of two horizontal edges. The three elastic bands stretch respectively across three edges of the bottom corner such that the cargo is secured tightly around the corner to prevent foreign objects to be inserted therethrough.

Figure 1B:
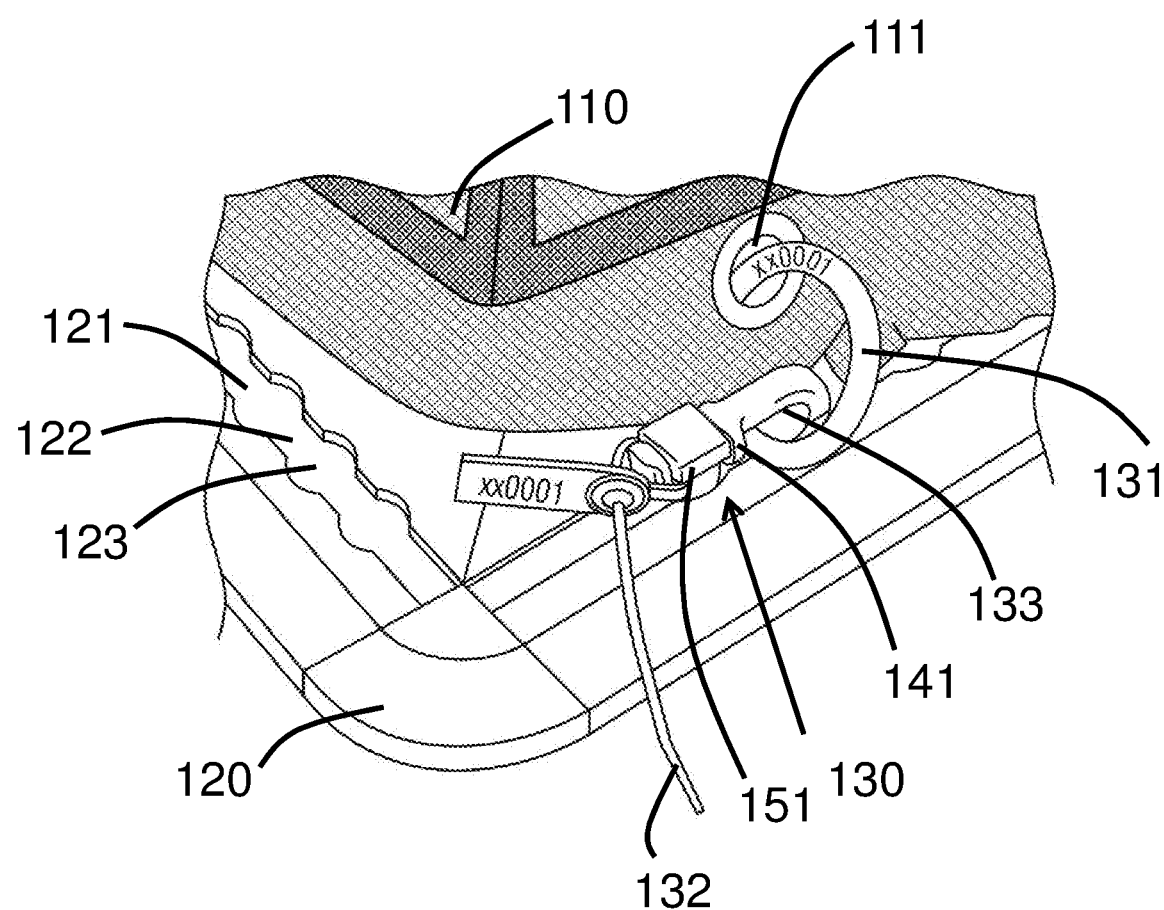
FIG. 1*b* is an enlarged partial view of the dashed circle in FIG. 1*a* in accordance with an example embodiment.

Referring to FIG. 1*b*, the locking assembly 130 comprises an anchor 133, a retaining ring 131, and a cable tie 132.

Still referring to FIG. 1*b*, the channel 121 comprises a plurality of neck portions 122 and open portions 123. The neck portions 122 and the open portions 123 are distributed around the channel 121 in a repeating pattern of semicircles and straight lines as shown. The open portion has a width same as that of the channel. The neck portion has an upper part of the channel narrowing inwardly.

In one example embodiment, during cargo transportation, cargo is set onto the pallet 120 and covered by both a traditional network cover and the cargo net 110. The traditional network cover may be a conventional network of fabric bands that are used to hold the cargo in place, and contain large open areas. The cargo net 110 can be either inside or outside the traditional network cover. The fine holes of the cargo net ensure that a user can still see the cargo inside while covered. One skilled in the art will appreciate that cargo can be secured with a cargo net with or without a traditional network cover.

As shown, the locking assembly 130 is provided locks or secures the cargo net 110 to the pallet 120. A base member 141 of the locking assembly 130 engages the channel 121. The retaining ring 131 locks to both the opening 111 of the cargo net 110 and the hole of the base member 141. A cable tie 132 fits through holes in the base member 141 and in the bolt 151 and prevents the bolt 151 from moving from a locked position to an unlocked position. In the locked position, the locking assembly 130 is locked onto the pallet 120 and cannot be removed with destroying the locking assembly or the pallet 120.

In one example embodiment, the bolt, the spring, and the base member are fitted together such that they are not separable or removable without destroying the locking assembly.

Figure 2A:
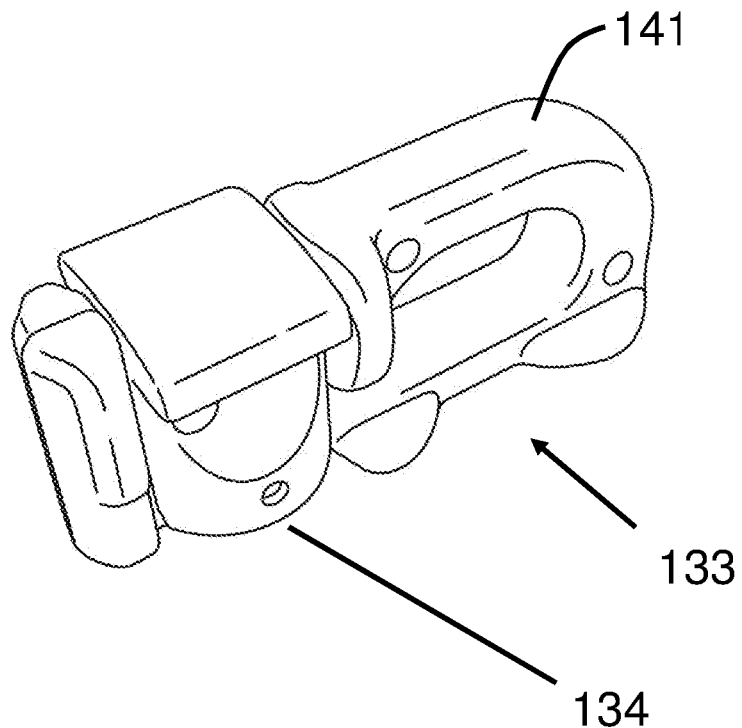
FIG. 2*a* shows a perspective view of an anchor in a locked position in accordance with an example embodiment.

FIG. 2*a* shows a perspective view of the anchor 133 in a locked position 134. In the locked position the base member 141 is prevented from sliding in the channel.

Figure 2B:
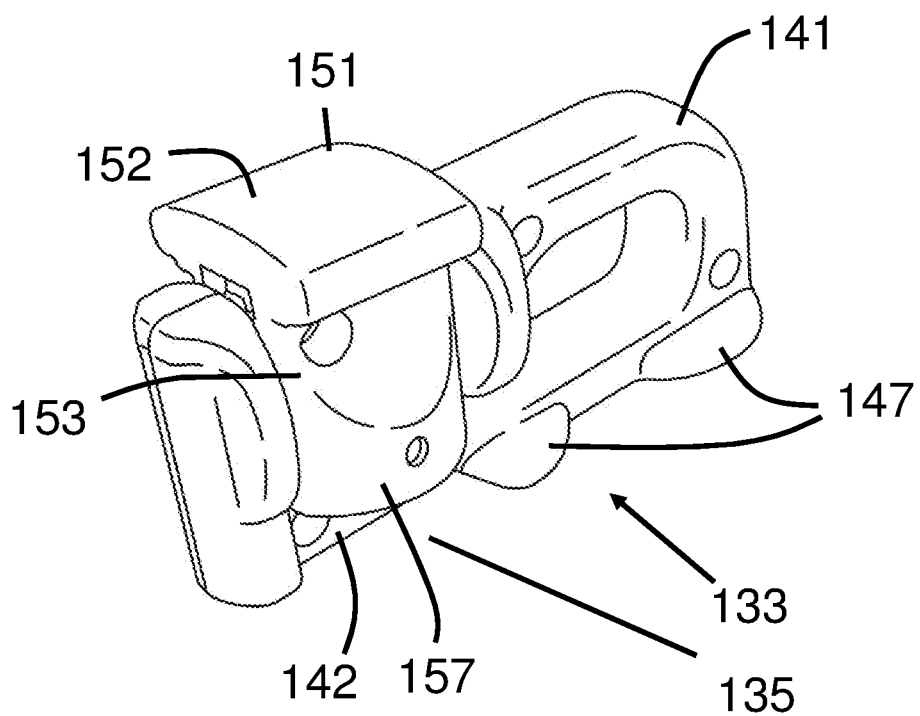
FIG. 2*b* shows a perspective view of the anchor in an unlocked position in accordance with an example embodiment.

FIG. 2*b* shows a perspective view of the anchor 133 in an unlocked position 135. In the unlocked position the base member can slide in the channel.

In one example embodiment, two parallel protrusions 153 include outer walls 157 that protrude outwardly. When in the unlocked position, shown in FIG. 2b, with an external force applied on the head 152, the bolt 151 moves up from the base member 141, and the outer walls 157 disengage the channel, such that the feet 147 can fit into the open portion of the channel and the neck 142 can fit into the neck portion. Then referring to FIG. 1b, the anchor 133 is removable to the channel 121 and can slide along the channel 121. When the feet slide to the neck portion 122 and the neck slides to the open portion 123, the external force is withdrawn, and the bolt 151 moves back to the locked position. The outer walls engage the open portion 123 of the channel 121, such that the anchor 133 is prevented from being moving along the pallet 120. The feet at the neck portion prevent the anchor from being removed from the channel 121 of the pallet 120 without destroying the anchor or the channel. In one embodiment, the width of the out wall is same as that of the channel.

Figure 3:
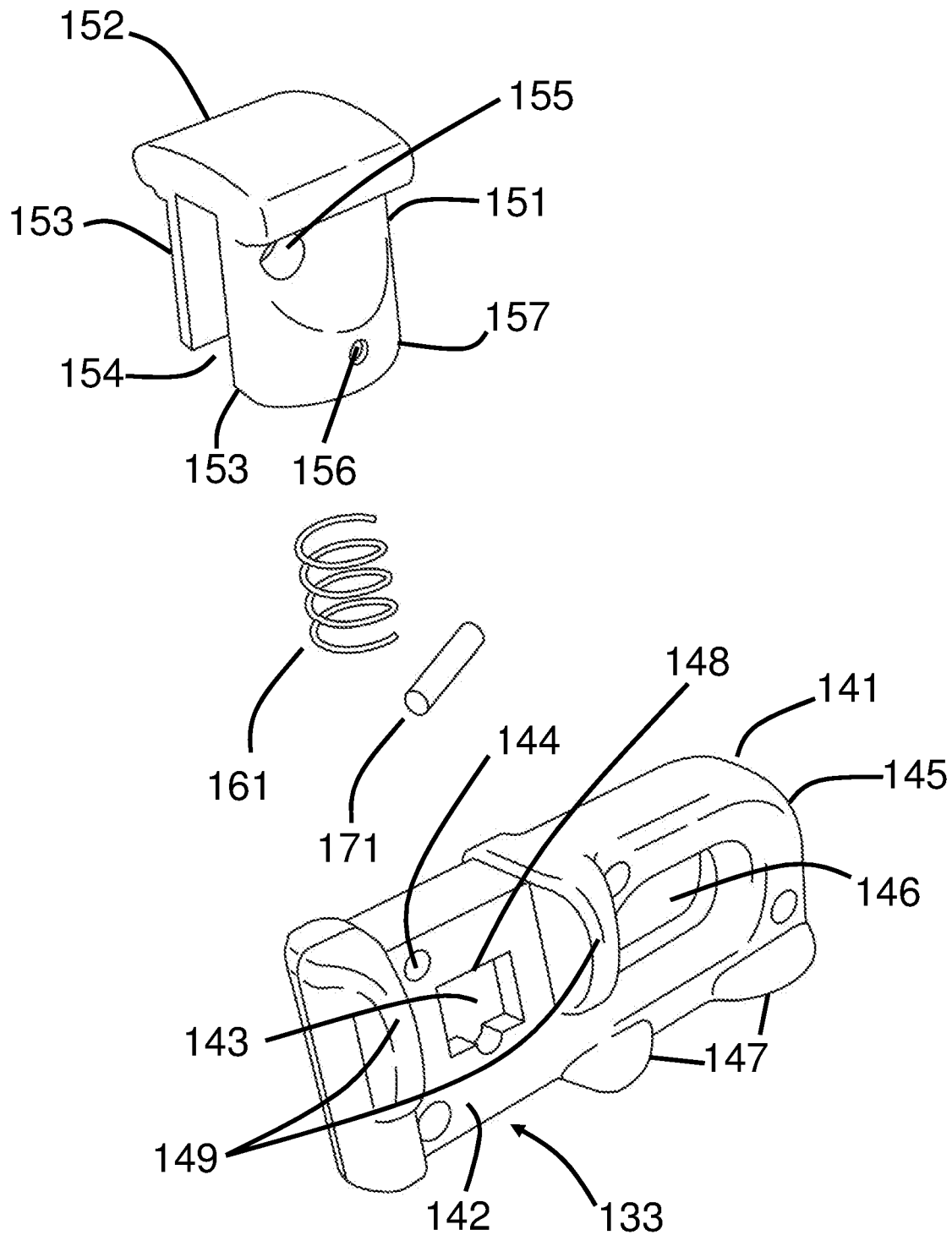
FIG. 3 shows an exploded view of the anchor in accordance with an example embodiment.

FIG. 3 shows an exploded view of the anchor 133. The anchor 133 includes a base member 141, a bolt 151, a spring 161, and a pin 171. The base member 141 has a neck 142 with a first hole 143 and a second hole 144, a body 145 with a third hole 146, and at least two feet 147 that slides into the channel 121 formed in the pallet 120. The bolt 151 has a head 152 and two parallel protrusions 153 that extend outwardly from the head. Each of the parallel protrusion 153 have a fourth hole 155. The two parallel protrusions 153 create a gap 154 that receives the neck 142. The neck 142 has a width fitting into the neck portion 122 of the channel 121. The feet 147 have width fitting into the open portion of the channel 121 but narrower than the width of the neck portion 122. Such that the anchor 133 cannot be removed when the feet are located at the neck portion without destroying the channel or the anchor.

Also referring to FIG. 3, the spring 161 is positioned in the first hole 143 of the neck 142. The spring 161 biases the bolt 151 between the locked position 134 and the unlocked position 135. The pin 171 fits through a fifth hole 156 on the bolt such that one end of the spring 161 engages against a top end 148 adjacent to the first hole 143 and another end of the spring 161 engages against the pin 171.

In one example embodiment, the bolt 151, the spring 161, and the base member 141 connect together such that they are not separable or removable without destroying the anchor 133. In one example embodiment, a bottom end of the first hole has a recess to receive the pin when the bolt is in the locked position. In one example embodiment, the base member further includes two pairs of guards 149. One pair of guard is located on a fore-end of the base member, and another pair is located between the neck and the third hole 146. The two pairs of guards 149 prevent the base member from sliding back and forth relative to the bolt. Moreover, the neck 142 and the gap 154 have widths narrower than a width of the pairs of the guard. In this way, the guard protects the connection among the bolt 151, the spring 161, and the base member 141 from being inserted and destroyed by foreign thin objects.

In one example embodiment, when the bolt is in the locked position 134, the fourth hole 155 in the bolt aligns with the second hole 144 in the base member 141. The cable tie 132 can then fit through the second hole 144 in the base member 141 and the fourth hole 155 in the bolt 151. The cable tie 132 locks the bolt 151 and the base member 141 together and prevents the bolt 151 from moving up from the locked position 134 to the unlocked position 135. The bolt and the base member cannot be separated without destroying the cable tie after the cable tie is tied.

In one example embodiment, as shown in FIG. 3, the spring 161 has a rectangle shape from a side view. The first hole 143 in the base member 141 also has a rectangle shape from a side view, and the rectangle shape of the spring fits within the rectangle shape of the first hole 143.

In one example embodiment, the spring is in an uncompressed position when the bolt is in the locked position. With the external force, the spring is in a compressed position, biasing the bolt 151 away from the base member 141 into the unlocked position.

Figure 4:
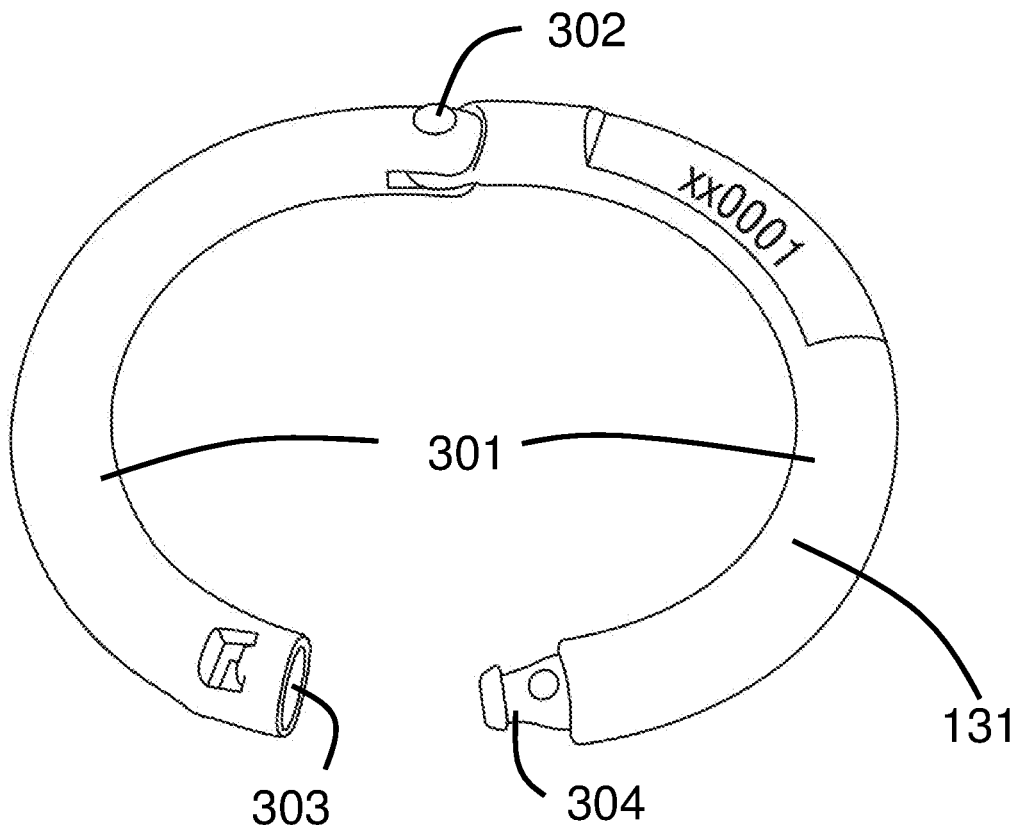
FIG. 4 shows a perspective view of a retaining ring in accordance with an example embodiment.

In one example embodiment, FIG. 4 shows the retaining ring 131 that includes two half-rings 301 that are pivotally connected at a pivot or hinged end 302. One free end of one half-ring includes a bore 303, and one free end of another half-ring includes a head portion 304. The head portion 304 can be installed in the bore 303.

In one example embodiment, the retaining ring is self-locking and cannot be unlocked without destroying the retaining ring. For example, once the two ends are connected together, they cannot be removed or decoupled without destroying the retaining ring.

Figure 5:
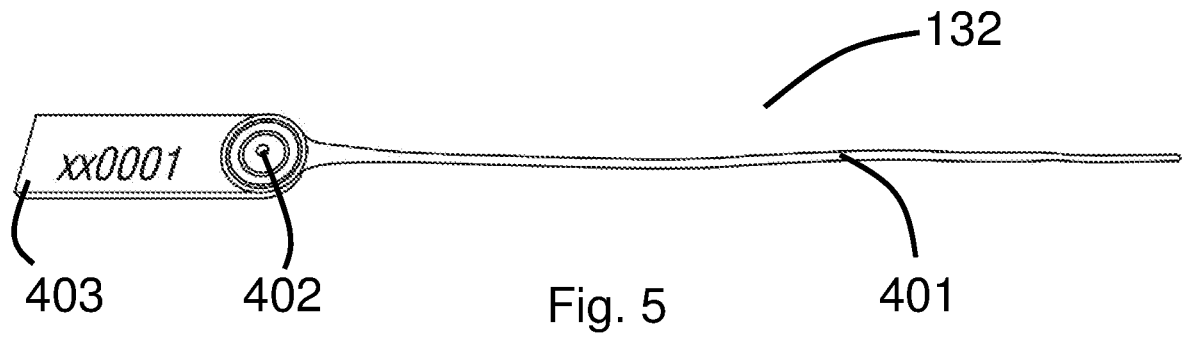
FIG. 5 shows a perspective view of a cable tie in accordance with an example embodiment.

In one example embodiment, FIG. 5 shows the cable tie 132 that includes a flexible tape section 401 and a head 403 of the cable tie. The flexible tape section 401 engages with a pawl 402 in the head 403 to form a ratchet so that as the free end of the tape section is pulled the cable tie tightens.

In one example embodiment, the cable tie 132 is self-locking, and cannot be unlocked without destroying the cable tie. In one example embodiment, each cable tie has a length that can only lock one anchor. As such, each cable tie locks to a single anchor. Since each locking assembly includes its own cable tie and retaining ring, individual locking assemblies can be removed or replaced from the cargo net and pallet without disturbing or involving other locking assemblies also locked to the pallet and cargo net.

Now referring to FIG. 6, in one example embodiment of the invention, a method of using above described locking assembly is provided.

Block 501 states provide a locking assembly comprising an anchor to engage with the pallet, that includes a base member having a neck with a first hole and a second hole, a body with a third hole, and two feet that slide into a channel formed in the pallet; a bolt having a head and two parallel protrusions that extend outwardly from the head, that create a gap that receives the neck, and that have a fourth hole on each of the protrusions; and a spring that is positioned in the first hole of the neck and that biases the bolt between a locked position in which the base member is prevented from sliding in the channel and an unlocked position in which the base member slides in the channel.

In one example embodiment, the channel comprises a plurality of neck portions and open portions. The neck portion has an upper part of the channel narrowing inwardly. When applying an external force applied on the head, the bolt moves up from the base member, and disengages the channel. In this position, the feet can fit into the open portion of the channel and the neck can fit into the neck portion of the channel. The anchor is removable to the channel and enabled to slide along the channel. When the feet slide to the neck portion and the neck slides to the open portion, the external force is withdrawn. The bolt moves back and engages the open portion, such that the anchor is prevented from being moving along the channel. The feet at the neck portion prevent the anchor from being removed from the channel without destroying the anchor or the channel.

Block 502 states provide a retaining ring that locks to both the cargo net and the third hole in the body of the base member.

In one example embodiment, the retaining ring has two half-rings that permanently connect together when the ends are locked together. One of the half-ring goes through the cargo net and the third hole and then locks with an end of the other half-ring. The self-locking retaining ring cannot be unlocked without destroying the retaining ring.

Block 503 states provide a cable tie that fits through the second hole in the base member and the fourth hole in the bolt and prevents the bolt from moving from the locked position to the unlocked position.

When the bolt is in the locked position, the fourth hole in the bolt aligns with the second hole in the base member. In one example embodiment, the cable tie includes a flexible tape section and a head with a pawl. The flexible tape section then fits through the second hole and the fourth hole. Such that the bolt is prevented from moving up from the base member.

In one example embodiment, the anchor further includes a pin that fits through a fifth hole on the bolt. One end of the spring engages against a top end adjacent the first hole and another end of the spring engages against the pin. In one example embodiment a bottom end of the first hole has a recess to receive the pin when the bolt is in the locked position. The bolt, the spring and the base member are fitted together such that they are not separable or removable without destroying the anchor.

In one example embodiment, the bolt and the base member cannot be separated without destroying the cable tie after the cable tie is tied.

In one example embodiment, each of the two parallel protrusions of the bolt have an outer wall protruding outwardly. When applying an external force applied on the head, the outer walls disengage the channel. Such that the feet can fit into the open portion of the channel and the neck can fit into the neck portion. The anchor is removable to the channel and enabled to slide along the channel. When the feet slide to the neck portion and the neck slides to the open portion, the external force is withdrawn. The bolt is in the locked position and the outer walls engage channel, such that the anchor is prevented from being moving along or being removed from the channel without destroying the anchor or the channel.

In one exemplary embodiment, the locking assembly 130 is provided in a predetermined set, and each individual retaining ring 131, cable tie 132 and the anchor 133 has identical identifier for a user or a machine to identify whether locking assembly 130 belong to the predetermined set or not. The identifier can be a serial number, a barcode, an RFID, or other identifiers that allow a user to identify using human eyes or through a specific machine.

As used herein, "cargo" are goods or produce being conveyed by ship, land, or aircraft.

As used herein, a "pallet" is a flat transport structure that supports cargo in a stable fashion while being lifted by a forklift, pallet jack, front loader, work saver, or other jacking device, or a crane.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

What is claimed is:

1. A locking assembly that locks a cargo net to a pallet, the locking assembly comprising:
    an anchor that includes:
        a base member having a neck with a first hole and a second hole, a body with a third hole, and two feet that slides into a channel formed in the pallet,
        a bolt having a head and two parallel protrusions that extend outwardly from the head, that create a gap that receives the neck, and that have a fourth hole on each of the protrusion, and
        a spring that is positioned in the first hole of the neck and that biases the bolt between a locked position in which the base member is prevented from sliding in the channel and an unlocked position in which the base member slides in the channel;
    a retaining ring that locks to both the cargo net and the third hole in the body of the base member; and
    a cable tie that locks the base member and the bolt together through the second hole in the base member and the fourth hole in the bolt and prevents the bolt from moving from the locked position to the unlocked position.

2. The locking assembly according to claim 1, wherein when the bolt is in the locked position, the fourth hole in the bolt aligns with the second hole in the base member.

3. The locking assembly according to claim 1, wherein the spring is in a compressed position when the bolt is in the unlocked position, and the spring is in an uncompressed position when the bolt is in the locked position.

4. The locking assembly according to claim 1, wherein the cable tie is self-locking and cannot be unlocked without destroying the cable tie.

5. The locking assembly according to claim 1, wherein the retaining ring is self-locking and cannot be unlocked without destroying the retaining ring.

6. The locking assembly according to claim 1, wherein the spring has a rectangle shape from a side view, the first hole in the base member has a rectangle shape from a side view, and the rectangle shape of the spring fits within the rectangle shape of the first hole.

7. The locking assembly according to claim 1, wherein the anchor further includes a pin that fits through a fifth hole on the bolt such that one end of the spring engages against a top end adjacent to the first hole and another end of the spring engages against the pin.

8. The locking assembly according to claim 7, wherein the bolt, the spring, and the base member connect together such that they are not separable or removable without destroying the anchor.

9. The locking assembly according to claim 1, wherein the bolt and the base member cannot be separated without destroying the cable tie after the cable tie is tied.

10. The locking assembly according to claim 1, wherein the two parallel protrusions include outer walls that protrude outwardly, the outer walls engage the pallet and prevent the anchor from moving in a channel of the pallet when the bolt is in the locked position, and the outer walls disengage the pallet to enable the anchor to slide in the channel when the bolt is in the unlocked position.

11. A locking assembly that locks a cargo net to a pallet, the locking assembly comprising:
    an anchor that removably locks to the pallet and includes:
        a base member having two feet that extend outwardly from two opposing side walls, a first hole, a second hole, and a third hole, a bolt having two spaced apart protrusions that have a fourth hole on each of the protrusion, that form a gap therebetween, and that slidably receive the base member, and a spring that is positioned in the first hole of the base member and that biases the bolt between a locked position in which the bolt engages the pallet and prevents the anchor from moving in a channel of the pallet and an unlocked position in which the bolt moves and disengages the pallet to enable the anchor to slide in the channel;

a self-locking retaining ring that locks around an opening in the cargo net and the third hole in the base member; and a self-locking cable tie that locks the base member and the bolt together through the fourth hole in the bolt and the second hole in the base member when the bolt is in the locked position and prevents the bolt from moving from the locked position to the unlocked position.

12. The locking assembly according to claim 11, wherein when the bolt is in the locked position, the fourth hole in the bolt aligns with the second hole in the base member.

13. The locking assembly according to claim 11, wherein when the bolt is in the unlocked position, the spring in the first hole is in a compressed position; when the bolt is in the locked position, the spring in the first hole is in an uncompressed position.

14. The locking assembly according to claim 11, wherein the anchor further includes a pin that fits through a fifth hole on the bolt, such that one end of the spring engages against a top end of the first hole and another end of the spring engages against the pin.

15. The locking assembly according to claim 14, wherein the bolt, the spring and the base member are fitted together such that they are not separable or removable without destroying the anchor.

16. The locking assembly according to claim 11, wherein the bolt and the base member cannot be separated without destroying the cable tie after the cable tie is tied.

17. A method to lock a cargo net to a pallet, comprising: providing a locking assembly comprising:
an anchor to engage with the pallet, that includes:
a base member having a neck with a first hole and a second hole, a body with a third hole, and two feet that slide into a channel formed in the pallet,
a bolt having a head and two parallel protrusions that extend outwardly from the head, that create a gap that receives the neck, and that have a fourth hole on each of the protrusions, and
a spring that is positioned in the first hole of the neck and that biases the bolt between a locked position in which the base member is prevented from sliding in the channel and an unlocked position in which the base member slides in the channel;
providing a retaining ring that locks to both the cargo net and the third hole in the body of the base member; and
providing a cable tie that locks the base member and the bolt together through the second hole in the base member and the fourth hole in the bolt and prevents the bolt from moving from the locked position to the unlocked position.

18. The method according to claim 17, wherein the anchor further includes a pin that fits through a fifth hole on the bolt, such that one end of the spring is put against a top end of the first hole and another end of the spring is put against the pin; a bottom end of the first hole has a recess to receive the pin when the bolt is in the locked position; the bolt, the spring and the base member are fitted together such that they are not separable or removable without destroying the anchor.

19. The method according to claim 17, wherein the bolt and the base member cannot be separated without destroying the cable tie after the cable tie is tied.

20. The method according to claim 17, wherein each of the two parallel protrusions have an outer wall protruding outwardly, such that when the bolt is in the locked position, each outer wall engages the pallet and prevents the anchor from moving in a channel of the pallet, and when the bolt is in the unlocked position each outer wall disengages the pallet to enable the anchor to slide in the channel.

* * * * *